United States Patent
Suzuki

(10) Patent No.: US 9,589,001 B2
(45) Date of Patent: Mar. 7, 2017

(54) DOCUMENT MANAGEMENT APPARATUS AND RECORDING MEDIUM

(71) Applicant: FUJI XEROX CO., LTD., Minato-ku, Tokyo (JP)

(72) Inventor: Mai Suzuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 316 days.

(21) Appl. No.: 14/310,678

(22) Filed: Jun. 20, 2014

(65) Prior Publication Data

US 2015/0110363 A1    Apr. 23, 2015

(30) Foreign Application Priority Data

Oct. 22, 2013    (JP) ................... 2013-219196

(51) Int. Cl.
    *G06F 17/30* (2006.01)
(52) U.S. Cl.
    CPC .... *G06F 17/30312* (2013.01); *G06F 17/3012* (2013.01)
(58) Field of Classification Search
    CPC .................................................. G06F 17/3012
    See application file for complete search history.

(56) References Cited

U.S. PATENT DOCUMENTS

| 7,506,371 B1* | 3/2009 | Ben-Natan ............ | G06F 21/316 726/18 |
| 9,275,065 B1* | 3/2016 | Ganesh ............. | G06F 17/30082 |
| 2007/0111794 A1* | 5/2007 | Hogan ................... | A63F 13/12 463/42 |
| 2011/0321175 A1* | 12/2011 | Slater .................... | G06F 21/552 726/28 |
| 2012/0117113 A1* | 5/2012 | Fujisawa ........... | G06F 17/30144 707/771 |
| 2013/0104080 A1* | 4/2013 | Bosworth .............. | G06Q 10/10 715/838 |

FOREIGN PATENT DOCUMENTS

| JP | 2006-293671 A | 10/2006 |
| JP | 2008-42636 A | 2/2008 |
| JP | 2010-224947 A | 10/2010 |

* cited by examiner

*Primary Examiner* — Kris Mackes
(74) *Attorney, Agent, or Firm* — Sughrue Mion, PLLC

(57) ABSTRACT

A document management apparatus includes a reception unit, an operation information extraction unit, a memory, an executability determination unit, and an operation execution unit. The reception unit receives an operation request for an electronic document from an operator. The operation information extraction unit extracts operation information related to the operation request. The memory stores operation history information which is an accumulation of previous operation information which is operation information related to previous operation requests previously made for electronic documents. The executability determination unit reads the operation history information from the memory to determine whether or not an operation pertaining to the operation request is executable on the basis of the operation information and the operation history information. The operation execution unit executes the operation pertaining to the operation request in the case where the executability determination unit determines that the operation is executable.

11 Claims, 8 Drawing Sheets

FIG. 2

| OPERATION DATE/TIME 60 | OPERATOR 62 | IP ADDRESS 64 | CLIENT 66 | OPERATION CONTENT 68 | OPERATION OBJECT 70 |
|---|---|---|---|---|---|
| 12:16, 03/05/2013 | TARO FUJI | yyy.yy.yy.zz | WEB BROWSER | DOWNLOAD | A CORPORATION QUOTATION |
| 08:55, 03/05/2013 | JIRO FUJI | yyy.yy.yy.dd | WEB BROWSER | VERSION DELETION | B CORPORATION REQUEST |
| 18:37, 03/04/2013 | HANAKO FUJITA | yyy.yy.yy.yy | WEB BROWSER | DOWNLOAD | C CORPORATION PLAN |
| 16:39, 03/04/2013 | TARO FUJI | xxx.xx.xx.aa | WEB BROWSER | UPLOAD (OVERWRITE) | A CORPORATION QUOTATION |
| 10:41, 03/04/2013 | TARO FUJI | xxx.xx.xx.bb | WEB BROWSER | RENAME | QUOTATION |
| 08:30, 03/04/2013 | TARO FUJI | yyy.yy.yy.yy | WEB BROWSER | DOWNLOAD | A CORPORATION QUOTATION |
| 11:23, 03/03/2013 | TARO FUJI | xxx.xx.xx.xx | WEB BROWSER | UPLOAD (NEW) | A CORPORATION QUOTATION |
| 09:28, 03/03/2013 | JIRO FUJI | yyy.yy.yy.zz | WEB BROWSER | DOWNLOAD | B CORPORATION REQUEST |
| 08:32, 03/03/2013 | TARO FUJI | yyy.yy.yy.dd | WEB BROWSER | VERSION DELETION | A CORPORATION QUOTATION |
| 17:37, 03/02/2013 | HANAKO FUJITA | yyy.yy.yy.cc | WEB BROWSER | DOWNLOAD | C CORPORATION QUOTATION |
| 14:44, 03/02/2013 | JIRO FUJI | xxx.xx.xx.aa | WEB BROWSER | UPLOAD (OVERWRITE) | A CORPORATION QUOTATION |
| 09:43, 03/02/2013 | HANAKO FUJITA | xxx.xx.xx.bb | WEB BROWSER | RENAME | D CORPORATION QUOTATION |
| 08:26, 03/02/2013 | HANAKO FUJITA | yyy.yy.yy.yy | WEB BROWSER | DOWNLOAD | C CORPORATION PLAN |
| 11:34, 03/01/2013 | TARO FUJI | xxx.xx.xx.xx | WEB BROWSER | UPLOAD (NEW) | B CORPORATION REQUEST |

| OPERATION DATE/TIME | OPERATOR | IP ADDRESS | CLIENT | OPERATION CONTENT | OPERATION OBJECT |
|---|---|---|---|---|---|
| 22:00, 03/06/2013 | TARO FUJI | aaa.aa.aa.aa | TABLET | MOVE | C CORPORATION PLAN |

| OPERATION DATE/TIME | OPERATOR | IP ADDRESS | CLIENT | OPERATION CONTENT | OPERATION OBJECT |
|---|---|---|---|---|---|
| 22:00, 03/06/2013 | TARO FUJI 3 | aaa.aa.aa.aa | TABLET | MOVE | A CORPORATION PLAN |

DOCUMENT MANAGEMENT APPARATUS AND RECORDING MEDIUM

CROSS-REFERENCE TO RELATED APPLICATIONS

This application is based on and claims priority under 35 USC 119 from Japanese Patent Application No. 2013-219196 filed Oct. 22, 2013.

BACKGROUND

Technical Field

The present invention relates to a document management apparatus and a recording medium.

SUMMARY

According to an aspect of the present invention, there is provided a document management apparatus including: a reception unit that receives an operation request for an electronic document from an operator; an operation information extraction unit that extracts operation information related to the operation request; a memory that stores operation history information which is an accumulation of previous operation information which is operation information related to previous operation requests previously made for electronic documents; an executability determination unit that reads the operation history information from the memory to determine whether or not an operation pertaining to the operation request is executable on the basis of the operation information and the operation history information; and an operation execution unit that executes the operation pertaining to the operation request in the case where the executability determination unit determines that the operation is executable.

BRIEF DESCRIPTION OF THE DRAWINGS

Exemplary embodiments of the present invention will be described in detail based on the following figures, wherein:

FIG. 2 illustrates the data structure of operation history information;

FIG. 3 illustrates the data structure of operation information extracted by an operation information extraction unit 42;

FIG. 7 illustrates the data structure of operation information related to an operation request for a document management apparatus 3'.

DETAILED DESCRIPTION

Document management apparatuses according to exemplary embodiments of the present invention will be described below. It should be noted that the present invention is not limited to the following exemplary embodiments.

First Exemplary Embodiment

Figure 1:
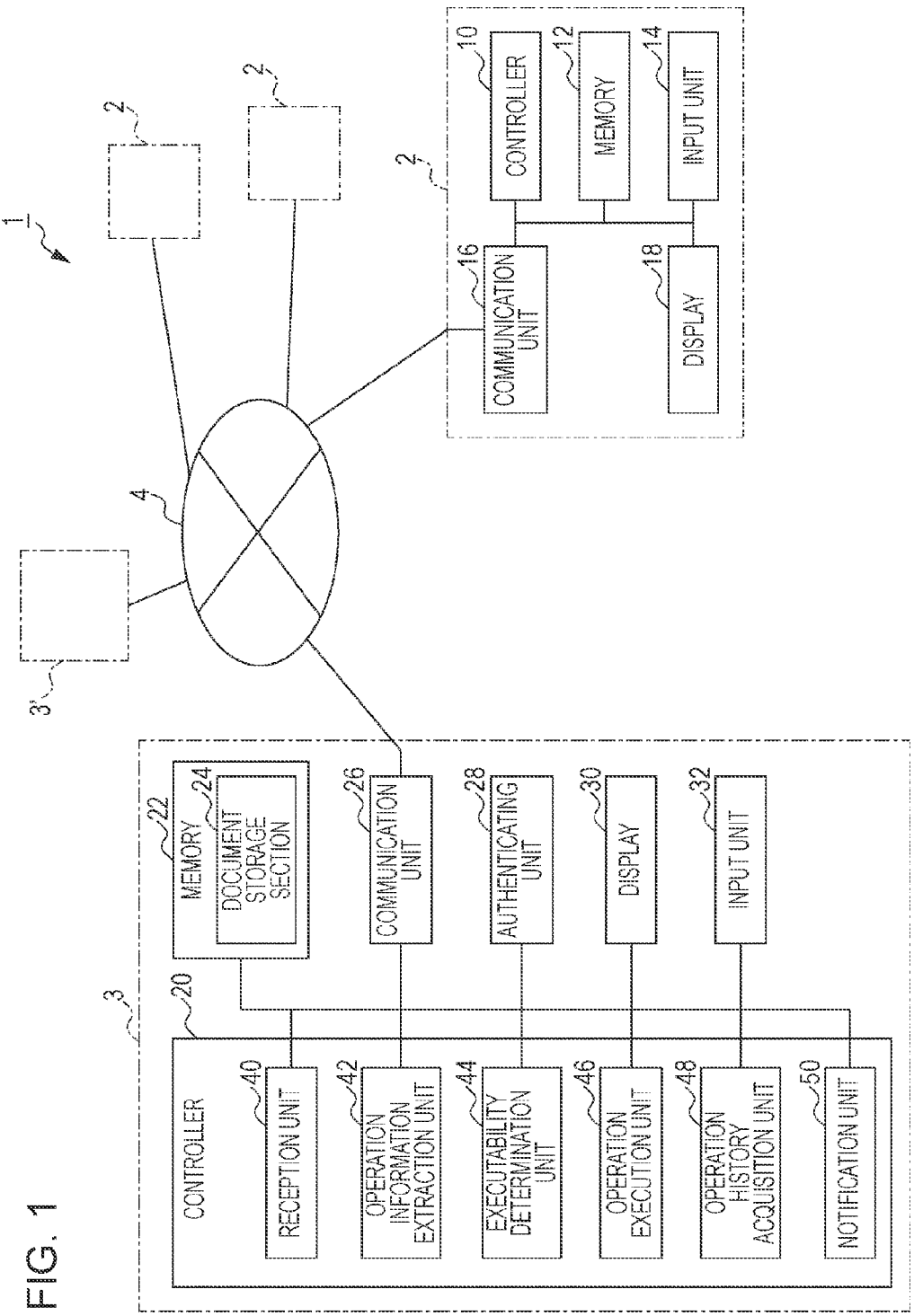
FIG. 1 illustrates a schematic configuration of a document management system 1 according to an exemplary embodiment.

FIG. 1 illustrates a schematic configuration of a document management system 1 according to an exemplary embodiment. The document management system 1 includes a client terminal 2, a document management apparatus 3, and a network 4 that connects between the client terminal 2 and the document management apparatus 3. In the exemplary embodiment, the document management system 1 is configurated as a server-client system with the document management apparatus 3 serving as a server. However, the document management apparatus 3 may be an apparatus that is operable directly by an operator and not via the network 4 such as a multi-function device, for example.

The client terminal 2 is a personal computer or a mobile terminal, for example, and includes a controller 10 such as a CPU, a memory 12 such as a ROM, a RAM, and a hard disk drive, an input unit 14 such as a keyboard, a mouse, and a touch panel, a communication unit 16 for connection to the network 4 such as a LAN card, and a display 18 such as a monitor. The client terminal 2 may also be a multi-function device or the like. The document management system 1 may include plural client terminals 2. In the exemplary embodiment, the client terminal 2 is utilized as a client that sends an operation request or the like for an electronic document to the document management apparatus 3. However, the client is not limited to a terminal, and may be an application. For example, the client may be an application provided through a cloud service or the like, and the application may send an operation request or the like for an electronic document to the document management apparatus 3.

The document management apparatus 3 includes a controller 20, a memory 22, a communication unit 26, and an authenticating unit 28. In the case where the document management apparatus 3 is a multi-function device or the like, the document management apparatus 3 may further include a display 30 that displays the content of a process performed by the document management apparatus 3 etc., and an input unit 32 that allows a user to input an instruction to the document management apparatus 3. The document management system 1 may include plural document management apparatuses 3. The configuration of the document management apparatus 3' is the same as that of the document management apparatus 3.

The controller 20 is a CPU of the document management apparatus 3, and includes a reception unit 40, an operation information extraction unit 42, an executability determination unit 44, an operation execution unit 46, an operation history acquisition unit 48, and a notification unit 50.

The memory 22 is a ROM, a RAM, or a hard disk drive, for example, and stores data to be processed by the document management apparatus 3 etc. The memory 22 stores a program that causes a server that serves as the document management apparatus 3 to function as the various units included in the document management apparatus 3. In addition, the memory 22 includes a document storage unit 24 that stores electronic documents managed by the document management apparatus 3.

The memory 22 stores an accumulation of previous operation information which is operation information related to operation requests previously made for electronic documents. Herein, operation information related to a single operation request previously made for an electronic document is referred to as "previous operation information", and a collection of the previous operation information is referred to as "operation history information".

FIG. 2 illustrates the data structure of the operation history information. The operation history information is illustrated as a table including an operation date/time column 60, an operator column 62, an IP address column 64, a client column 66, an operation content column 68, and an operation object column 70. For example, previous operation information 72 indicates that an operation request to "DOWNLOAD" an electronic document "C CORPORATION PLAN" was issued from a "WEB BROWSER" of a terminal with an IP address "yyy.yy.yy.yy" by "HANAKO FUJITA" at "18:37, Mar. 4, 2013" to the document management apparatus 3.

The document storage section 24 has plural folders, in each of which electronic documents are stored. For example, a person that attempts to have an electronic document to be stored in the document storage section 24 designates a folder for storage of the electronic document in accordance with the confidentiality level of the electronic document, the range of viewers of the electronic document, or the like. In the exemplary embodiment, a determination as to whether or not an operation is executable is not made for all the folders in the document storage section 24, and the document management apparatus 3 makes a determination as to whether or not an operation is executable only in the case where it is attempted to have an electronic document to be stored in some of the folders for registration of electronic documents at a high confidentiality level, or in the case where it is attempted to operate an electronic document stored in such folders, for example.

The communication unit 26 is a LAN card, for example, and is a unit for communication with the client terminal 2, another document management apparatus 3', and so forth via the network 4.

The authenticating unit 28 is a unit that authenticates a user of the document management apparatus 3. For example, in the case where a request for connection to the document management apparatus 3 is made from the client terminal 2, the authenticating unit 28 transmits image data that prompt input of a user ID and a password to the client terminal 2. Then, the authenticating unit 28 authenticates the user on the basis of the user ID and the password input by the user using the input unit 14 of the client terminal 2.

The reception unit 40 receives an operation request for an electronic document sent to the document management apparatus 3 from the client terminal 2 or another document management apparatus 3'. The operation request for an electronic document includes information designating an electronic document as the object for the operation request, and the operation content for the electronic document. In the case where the operation content is movement, uploading, or the like of an electronic document, the operation request includes information designating a folder in the document storage section 24 as the destination of movement or the destination of storage of the electronic document.

The operation information extraction unit 42 extracts operation information related to the operation request received by the reception unit 40. FIG. 3 illustrates the data structure of the operation information extracted by the operation information extraction unit 42. The content of the operation information is the same as that of the operation history information illustrated in FIG. 2, and illustrated as a table including an operation date/time column 60, an operator column 62, an IP address column 64, a client column 66, an operation content column 68, and an operation object column 70.

The full name of the operator is stored in the operator column. The full name of the operator is specified on the basis of the user ID acquired by the authenticating unit 28. That is, the memory 22 stores user information in which the user ID and the user name are associated, and the operation information extraction unit 42 specifies the operator name on the basis of the user ID acquired from the authenticating unit 28 and the user information read from the memory 22. The user ID acquired by the authenticating unit 28 may be stored as it is in the operator column 62.

Among the operation information, the operation date/time, the IP address, the client, the operation content, and the operation object are acquired on the basis of information included in the operation request itself. For example, the operation date/time, the IP address, and the client are acquired on the basis of information on the sender such as the client terminal 2 or another document management apparatus 3' attached to the header or the like of the operation request, and the operation content and the operation object are acquired from the payload portion of the operation request.

In the operation history information illustrated in FIG. 2 and the operation information illustrated in FIG. 3, only the file name of the electronic document as the operation object is stored in the operation object column 70. Alternatively, a file extension may be stored in addition to the file name of the electronic document as the operation object.

The executability determination unit 44 determines whether or not the operation pertaining to the operation request received by the reception unit 40 is executable on the basis of the operation information extracted by the operation information extraction unit 42 and the operation history information stored in the memory 22. The details of a process for determining whether or not the operation is executable will be discussed later using a flowchart.

The operation execution unit 46 executes the operation pertaining to the operation request received by the reception unit 40 in the case where the executability determination unit 44 determines that the operation is executable.

The operation history acquisition unit 48 integrates the operation information extracted by the operation information extraction unit 42 into the operation history information as previous operation information, and causes the memory 22 to store the integrated information.

The notification unit 50 notifies the client terminal 2 of the results of the determination as to whether or not the operation pertaining to the operation request is executable. For example, the notification unit 50 transmits to the client terminal 2 image data indicating that the operation pertaining to the operation request is determined to be executable or not executable. In the case where the document management apparatus 3 is a multi-function device or the like, in addition, the notification unit 50 may display on the display 30 of the document management apparatus 3 information indicating that the operation pertaining to the operation request is determined to be executable or not executable.

Figure 4:
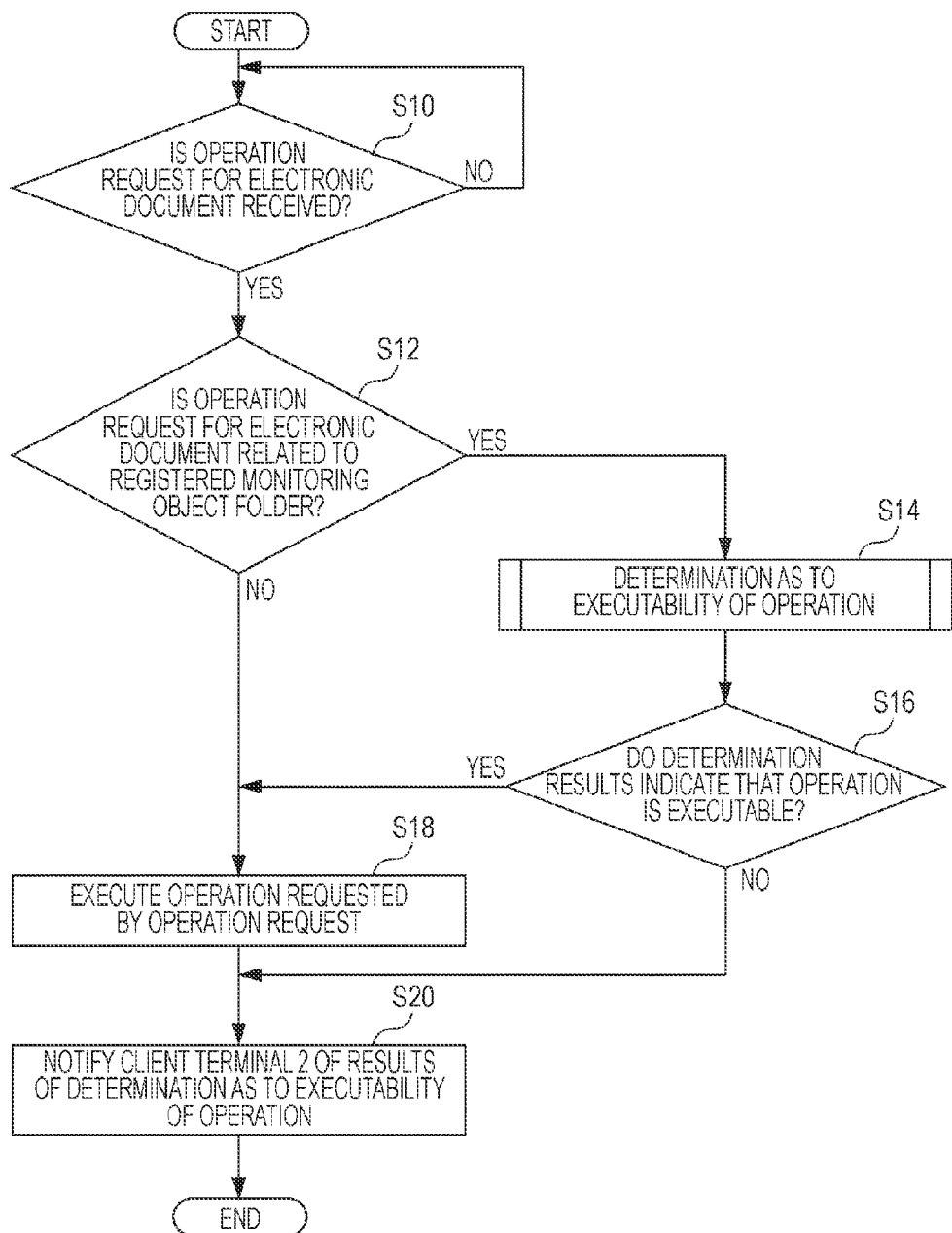
FIG. 4 is a flowchart illustrating the flow of a process according to the first exemplary embodiment.

The flow of a process performed by the document management apparatus 3 according to the exemplary embodiment will be described below. FIG. 4 is a flowchart illustrating the flow of a process according to the first exemplary embodiment.

In step S10, the reception unit 40 determines whether or not an operation request for an electronic document sent to the document management apparatus 3 is received. In the case where an operation request is received, the process proceeds to step S12. In the case where an operation request is not received, it is determined again whether or not an operation request is received (that is, the reception unit 40 stands by to receive an operation request).

In step S12, the controller 20 determines whether or not the operation request received in step S10 is related to a registered monitoring object folder. That is, the controller 20 determines whether or not the folder in the document storage section 24 designated as the destination of storage in the operation request is a registered monitoring object folder, or whether or not the folder storing the electronic document as the object of the operation request is a registered monitoring object folder. In the case where the operation request is related to a registered monitoring object folder, the process proceeds to step S14. In the case where the operation request is not related to a registered monitoring object folder, the process proceeds to step S18.

Figure 5:
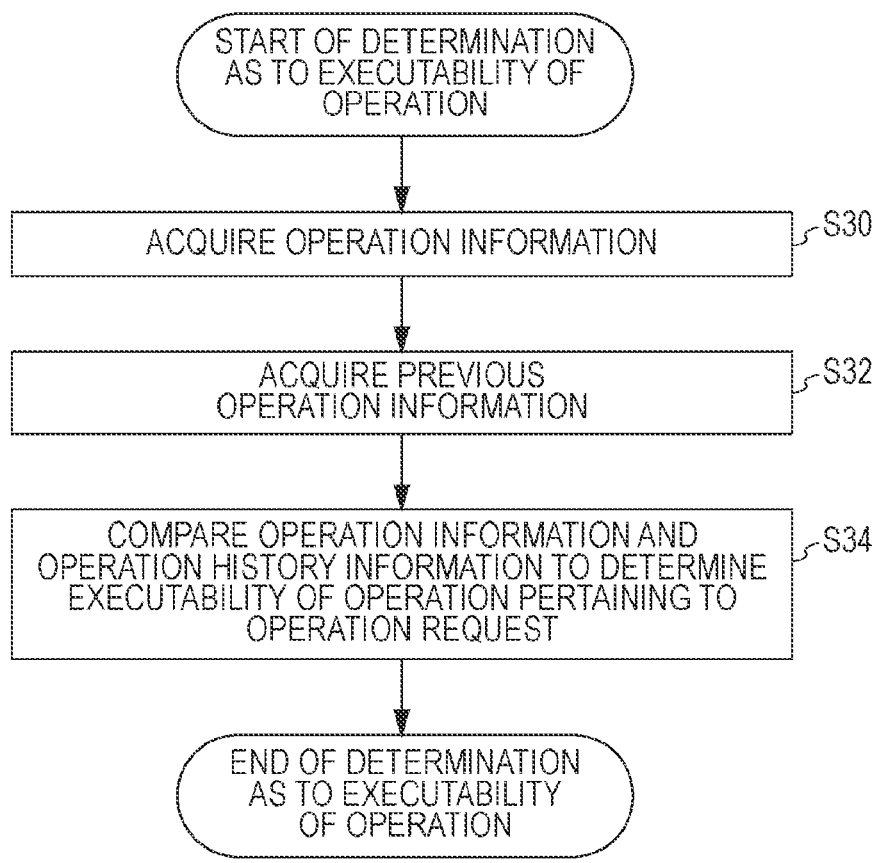
FIG. 5 is a flowchart illustrating the details of a process in step S14.

In step S14, the executability determination unit 44 determines whether or not the operation pertaining to the operation request received by the reception unit 40 is executable. FIG. 5 is a flowchart illustrating the details of a process in step S14.

In step S30, the operation information extraction unit 42 extracts operation information from the operation request received by the reception unit 40. In the exemplary embodiment, information illustrated in FIG. 3 is acquired as the operation information.

In step S32, the executability determination unit 44 reads operation history information from the memory 22. In the exemplary embodiment, information illustrated in FIG. 2 is read as the operation history information.

In step S34, the executability determination unit 44 compares the operation information extracted by the operation information extraction unit 42 with the operation history information read from the memory 22 to determine whether or not the operation pertaining to the operation request received by the reception unit 40 is executable.

In the exemplary embodiment, it is determined whether or not the operation is executable on the basis of the operation content and the operation object, among the information included in the operation information and the previous operation information. Specifically, the executability determination unit 44 acquires "MOVE" as the operation content and "C CORPORATION PLAN" as the operation object from the operation information illustrated in FIG. 3, and determines whether or not the operation history information illustrated in FIG. 2 includes previous operation information having "MOVE" as the operation content and "C CORPORATION PLAN" as the operation object. The operation content "MOVE" means to move an electronic document from one folder to another in the document storage section 24, for example.

As illustrated in FIG. 2, the operation history information includes previous operation information 72, 74, and 76 having "C CORPORATION PLAN" as the operation object. However, all the previous operation information 72, 74, and 76 has "DOWNLOAD" as the operation content. Thus, the operation history information does not include previous operation information having "MOVE" as the operation content and "C CORPORATION PLAN" as the operation object. In this case, the executability determination unit 44 determines that the operation pertaining to the operation request is not executable.

In the case where the operation history information includes previous operation information having "MOVE" as the operation content and "C CORPORATION PLAN" as the operation object, on the other hand, the executability determination unit 44 determines that the operation pertaining to the operation request is executable.

In the example discussed above, it is determined that the operation is executable in the case where the file names of the operation objects in the operation information and the previous operation information completely match each other. However, the executability determination unit 44 may determine that the operation is executable in the case where it is determined that the operation objects in the operation information and the previous operation information are similar to each other.

For example, a file name and an extension may be stored as the operation objects in the operation information and the previous operation information, and it may be determined that the two operation objects are similar to each other if the extensions of the operation objects in the operation information and the previous operation information are the same as each other. File names that differ only in letter case of the alphabets or character byte and two file names in the inclusion relation may also be determined to be similar to each other. When the file names are in the inclusion relation, all of one of the file names is included in the other file name. For example, in the case where one of the file names is "C CORPORATION QUOTATION" and the other is "C CORPORATION QUOTATION Ver0.1", the two files are determined to be similar to each other.

In the case where the electronic document as the operation object contains image information, it may be determined whether or not the operation objects are similar to each other on the basis of the image information. In this case, the executability determination unit 44 causes the memory 22 to store a copy of the electronic document pertaining to the operation request received by the reception unit 40, and performs a Fourier transform on image information extracted from the copy of the electronic document to acquire a Fourier spectrum. The same process is performed on the electronic document as the operation object in the previous operation information. Then, a correlation coefficient between the Fourier spectrum of the image extracted from the operation object in the operation information and the Fourier spectrum of the image extracted from the operation object in the previous operation information is calculated, and it is determined that the two operation objects are similar to each other in the case where the calculated correlation coefficient is equal to or more than a predetermined value.

In the case where the image information includes a human face, it may be determined whether or not the operation objects are similar to each other on the basis of the human face included in the image information. In this case, the executability determination unit 44 extracts image information from the electronic document pertaining to the operation request received by the reception unit 40, and detects a human face through an existing face recognition technology. The same process is performed on the electronic document as the operation object in the previous operation information. Then, it is determined that the two operation objects are similar to each other in the case where the human face included in the image extracted from the operation object in the operation information and the human face included in the image extracted from the operation object in the previous operation information are determined to be of an identical person.

Even in the case where the electronic document does not contain image information, the electronic document may be imaged and subjected to the process discussed above for a similarity determination. In this case, in order to perform a more accurate similarity determination, annotations (such as notes and comments) added to the electronic document may be removed from the electronic document before the electronic document is imaged.

In the case where the electronic document as the operation object contains audio information including a voice such as an audio file obtained by recording the minutes of a meeting, it may be determined whether or not the operation objects are similar to each other on the basis of the voice included in the audio information. In this case, the executability determination unit 44 extracts audio information from the electronic document pertaining to the operation request received by the reception unit 40, and analyzes the frequency spectrum of a voice included in the audio information. The same process is performed on the electronic document as the operation object in the previous operation information. Then, a correlation coefficient between the frequency spectrum of the voice included in the audio information extracted from the operation object in the operation information and the frequency spectrum of the voice included in the audio information extracted from the operation object in the previous operation information is calculated, and it is determined that the two operation objects are similar to each other in the case where the calculated correlation coefficient is equal to or more than a predetermined value.

When a comparison between the operation information and the operation history information performed in step S34 is finished, the process proceeds to step S16 of FIG. 4.

In step S16, the executability determination unit 44 references the results of the determination as to whether or not the operation pertaining to the operation request is executable. In the case where the operation is executable, the process proceeds to step S18. In the case where the operation is not executable, the process proceeds to step S20.

In step S18, the operation execution unit 46 executes an operation on the electronic document in accordance with the operation request received by the reception unit 40. In the exemplary embodiment, the operation execution unit 46 moves the electronic document "C CORPORATION PLAN" to a designated folder in the document storage section 24.

Figure 6:
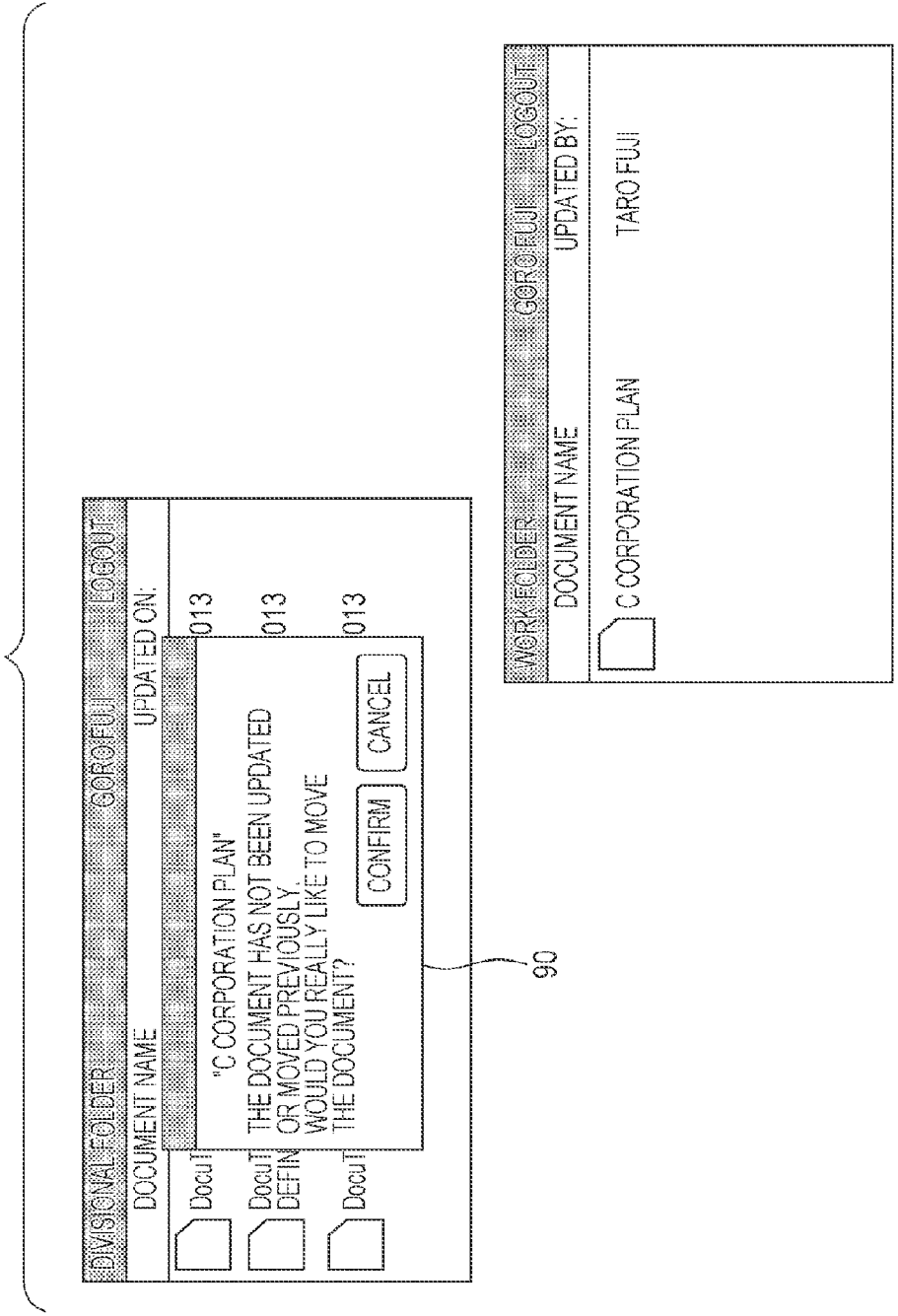
FIG. 6 illustrates an image that notifies an operator of the results of a determination as to whether or not an operation pertaining to an operation request is executable.

In step S20, the notification unit 50 notifies the client terminal 2 of the results of the determination as to whether or not the operation pertaining to the operation request is executable. FIG. 6 illustrates an image that notifies an operator of the results of the determination as to whether or not the operation pertaining to the operation request is executable. The notification unit 50 causes the display 18 to display an image containing a pop-up window 90 illustrated in FIG. 6, for example, to notify the operator of the results of the determination as to whether or not the operation pertaining to the operation request is executable. The example illustrated in FIG. 6 corresponds to a case where it is determined that the operation is not executable. In the case where an operation determined to be executable is executed, meanwhile, a pop-up window indicating that "C CORPORATION PLAN HAS BEEN MOVED TO xxx FOLDER", for example, is displayed in place of the pop-up window 90.

Second Exemplary Embodiment

In a second exemplary embodiment, it is determined whether or not the operation pertaining to the operation request is executable on the basis of the operator and the operation object. In the following plural exemplary embodiments including the second exemplary embodiment, the schematic configuration of the document management system 1 is the same as that according to the first exemplary embodiment. In addition, the process content is the same as that according to the first exemplary embodiment except for the process in step S34. Thus, the content described already will not be described.

In step S34, the executability determination unit 44 acquires "TARO FUJI" as the operator and "C CORPORATION PLAN" as the operation object from the operation information illustrated in FIG. 3, and determines whether or not the operation history information illustrated in FIG. 2 includes previous operation information having "TARO FUJI" as the operator and "C CORPORATION PLAN" as the operation object.

As illustrated in FIG. 2, the operation history information includes previous operation information 72, 74, and 76 having "C CORPORATION PLAN" as the operation object. However, all the previous operation information 72, 74, and 76 has "HANAKO FUJITA" as the operator. Thus, the operation history information does not include previous operation information having "TARO FUJI" as the operator and "C CORPORATION PLAN" as the operation object. In this case, the executability determination unit 44 determines that the operation pertaining to the operation request is not executable.

In the case where the operation history information includes previous operation information having "TARO FUJI" as the operator and "C CORPORATION PLAN" as the operation object, on the other hand, the executability determination unit 44 determines that the operation pertaining to the operation request is executable.

Also in the second exemplary embodiment, as in the first exemplary embodiment, the executability determination unit 44 may determine that the operation is executable also in the case where the operation objects in the operation information and the previous operation information are similar to each other.

In the second exemplary embodiment, in the case where the electronic document as the operation object contains image information including a human face, it may be presumed on the basis of the human face included in the image information that the operators in the operation information and the previous operation information match each other. For example, a case where an operator "TARO FUJI" makes an operation request related to an operation object "MINUTES 20130401.mpg" in the case where the operation history information includes only previous operation information including "HANAKO FUJITA" as the operator and "MINUTES 20120201.mpg" as the operation object is considered.

In this case, the file extension of "MINUTES 20130401.mpg" as the operation object in the operation information and the file extension of "MINUTES 20120201.mpg" as the operation object in the previous operation information are the same as each other, and thus the operation objects may be determined to be similar to each other. Because the operators are different, however, it is normally determined that the operation is not executable.

In the case where it is determined that "MINUTES 20130401.mpg" as the operation object includes the face of "HANAKO FUJITA" as the operator in the previous operation information, however, it is assumed that such an operation may be executed. It may be presumed that the operators in the operation information and the previous operation information match each other to determine that the operation pertaining to the operation request is executable even if the operators in the operation information and the previous operation information are different in data.

In the case where the process discussed above is performed, face information in which a user and face data on the user are associated is stored in advance in the memory 22, and the executability determination unit 44 compares face data included in the image extracted from the operation object and the face information read from the memory 22 to specify a person whose face data are included in the image information extracted from the operation object.

Also in the case where the electronic document as the operation object contains audio information including a voice, it may likewise be presumed on the basis of the voice included in the audio information that the operators match each other. For example, a case where the operation history information includes only previous operation information including "HANAKO FUJITA" as the operator and "MINUTES 20120201.mp3" as the operation object is considered. In the case where it is determined that "MINUTES 20130401.mp3" as the operation object includes the voice of "HANAKO FUJITA" as the operator in the previous operation information, it is assumed that such an operation may be executed. It may be presumed that the operators in the operation information and the previous operation information match each other to determine that the operation pertaining to the operation request is executable even if the operators in the operation information and the previous operation information are different in data.

Also in this case, voice information in which a user and voice data (for example, frequency spectrum) on the user are associated is stored in advance in the memory 22, and the executability determination unit 44 compares a voice included in the audio information extracted from the operation object and the voice information read from the memory 22 to specify a person whose voice data are included in the audio information extracted from the operation object.

In the case where the document management system 1 includes plural document management apparatuses 3 and 3', user information held by the document management apparatuses may be different so that even an identical operator may be determined as different operators.

FIG. 7 illustrates the data structure of operation information related to an operation request for the document management apparatus 3'. If a person whose user name in the user information stored in the document management apparatus 3 is "TARO FUJI" is registered as having "TARO FUJI 3" as the user name in the user information stored in the document management apparatus 3', and in the case where the operator is authenticated by the document management apparatus 3', the operator is determined as "TARO FUJI 3" in data in the document management apparatus 3'. Then, in the case where an operation request is made to move an electronic document stored in the document management apparatus 3' from the document management apparatus 3' to the document management apparatus 3 as indicated in the operation information of FIG. 7, it is determined whether or not the operation pertaining to the operation request is executable on the basis of the operation information in which the operator for the operation request is "TARO FUJI 3" and the operation history information stored in the document management apparatus 3.

However, the operation history information stored in the memory 22 of the document management apparatus 3 illustrated in FIG. 2 does not include previous operation information having "TARO FUJI 3" as the operator, and therefore it is determined that the operation pertaining to the operation request is not executable even though the operators are substantially identical.

In the exemplary embodiment, in order to prevent such a determination from being made, mapping information for the user information between the plural document management apparatuses is stored in the memory 22 of the document management apparatus 3, and the executability determination unit 44 determines matching between the operators on the basis of the mapping information. Examples of the mapping information include information in which the user name in the document management apparatus 3 and the user name in the document management apparatus 3' are associated. In the case where an electronic document is moved or the like between different document management apparatuses, meanwhile, the executability determination unit 44 may cause the operator to input at the client terminal 2 the user ID and the password for the document management apparatus 3 as the destination of movement of the electronic document, and determine matching between the operators on the basis of the user ID and the password.

Figure 8:
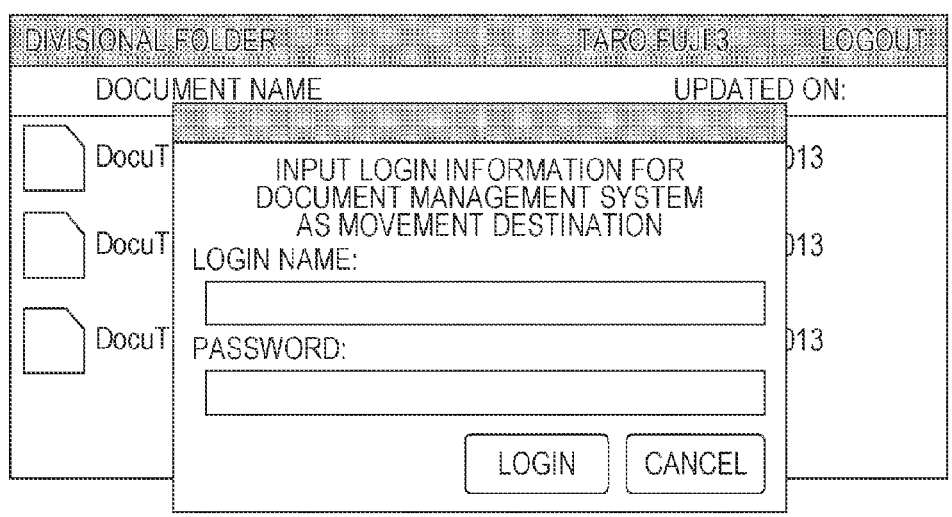
FIG. 8 illustrates an image that prompts input of a user ID and a password for a document management apparatus 3 as the destination of movement of an electronic document.

FIG. 8 illustrates an image that prompts input of a user ID and a password for the document management apparatus 3 as the destination of movement of an electronic document. In the case where the document management apparatus 3' receives an operation request to move an electronic document, for example, to another document management apparatus 3, the document management apparatus 3' causes the display 18 of the client terminal 2 to display the image illustrated in FIG. 8 to prompt the operator to input the user ID and the password for the document management apparatus 3 as the destination of movement of the electronic document.

Third Exemplary Embodiment

In a third exemplary embodiment, it is determined whether or not the operation pertaining to the operation request is executable on the basis of an operation date/time.

In step S34, the executability determination unit 44 references the operation date/time in all the previous operation information included in the operation history information to acquire the earliest operation time in a day and the latest operation time in a day. In the operation history information illustrated in FIG. 2, the earliest operation time in a day is "08:26" of the previous operation information 76, and the latest operation time in a day is "18:37" of the previous operation information 72. Thus, the executability determination unit 44 acquires the two operation times.

Then, it is determined whether or not the operation time "22:00" in the operation information illustrated in FIG. 3 falls between "08:26" and "18:37". In the exemplary embodiment, "22:00" does not fall between "08:26" and "18:37", and therefore the executability determination unit 44 determines that the operation pertaining to the operation request is not executable.

In the case where the operation time in the operation information falls between the earliest operation time in a day and the latest operation time in a day acquired from the operation history information, on the other hand, the executability determination unit 44 determines that the operation pertaining to the operation request is executable.

Fourth Exemplary Embodiment

In a fourth exemplary embodiment, it is determined whether or not the operation pertaining to the operation request is executable on the basis of an IP address. The IP addresses stored in the operation information and the previous operation information are the IP address of the client terminal 2 utilized by the operator. In the case where the client terminal 2 is used by way of another document management apparatus 3', however, the IP address of the document management apparatus 3' may also be used.

In step S34, the executability determination unit 44 acquires "aaa.aa.aa.aa" as the IP address from the operation information illustrated in FIG. 3, and determines whether or not the operation history information illustrated in FIG. 2 includes previous operation information having "aaa.aa.aa.aa" as the IP address.

As illustrated in FIG. 2, the operation history information does not include previous operation information having "aaa.aa.aa.aa" as the IP address. Thus, the executability determination unit 44 determines that the operation pertaining to the operation request is not executable.

In the case where the operation history information includes previous operation information having "aaa.aa.aa.aa" as the IP address, on the other hand, the executability determination unit 44 determines that the operation pertaining to the operation request is executable.

Fifth Exemplary Embodiment

In a fifth exemplary embodiment, it is determined whether or not the operation pertaining to the operation request is executable on the basis of a client. The client stored as the operation information and the previous operation information is an operation client utilized when the operator performs an operation. In the case where an operation request is transmitted from a web browser in the client terminal 2, for example, the client for the operation request is "WEB BROWSER". In the case where the client terminal 2 is a multi-function device and an operation request is transmitted from the multi-function device, the client for the operation request is "MULTI-FUNCTION DEVICE". Besides, in the case where an operation request is transmitted from a mobile terminal, "TABLET" is stored as the client. In the case where an operation request is made utilizing software that operates on the client terminal and that is capable of transmitting an operation request to the document management apparatus 3, the name of the software is stored as the client. In the case where an operation request is transmitted to the document management apparatus 3 using a cloud service, the name of the cloud service is stored as the client.

In step S34, the executability determination unit 44 acquires "TABLET" as the client from the operation information illustrated in FIG. 3, and determines whether or not the operation history information illustrated in FIG. 2 includes previous operation information having "TABLET" as the client.

As illustrated in FIG. 2, the operation history information does not include previous operation information having "tablet" as the client. Thus, the executability determination unit 44 determines that the operation pertaining to the operation request is not executable.

In the case where the operation history information includes previous operation information having "TABLET" as the client, on the other hand, the executability determination unit 44 determines that the operation pertaining to the operation request is executable.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document management apparatus comprising:
a reception unit configured to receive an operation request for an electronic document from an operator;
a memory configured to store operation history information which is an accumulation of previous operation information which is operation information related to previous operation requests previously made for electronic documents;
an executability determination unit configured to read the operation history information from the memory to determine whether a first operation, requested by the operation request to be performed to the electronic document, is executable using at least a determination that the first operation matches a second operation indicated in the operation history information as having been previously performed to the electronic document; and
an operation execution unit configured to, in the case where the executability determination unit determines that the first operation is executable by determining that the first operation matches the second operation, execute the first operation pertaining to the operation request, wherein
the operation execution unit is further configured to, in a case where the executability determination unit determines that the extension of the electronic document, as indicated in the operation request, matches the extension of the electronic document, as indicated in the operation history information, execute the operation pertaining to the operation request.

2. The document management apparatus according to claim 1, further comprising:
an operation history acquisition unit configured to integrate the operation information extracted by the operation information extraction unit into the operation history information as the previous operation information.

3. The document management apparatus according to claim 1,
wherein the operation information and the previous operation information include information indicating an operation content and information indicating the electronic document as an operation object, and
the executability determination unit is further configured to determine that the operation is executable in a case where the operation history information includes such previous operation information that the operation content in the operation information and the operation content in the previous operation information match each other and the operation object in the operation information and the operation object in the previous operation information match or are similar to each other.

4. The document management apparatus according to claim 1,
wherein the operation information and the previous operation information include information indicating an operator and information indicating an electronic document as an operation object, and
the executability determination unit determines that the operation is executable in a case where the operation history information includes such previous operation information that the operator in the operation information and the operator indicated in the previous operation information match each other and the operation object in the operation information and the operation object in the previous operation information match or are similar to each other.

5. The document management apparatus according to claim 3,
wherein the electronic document contains image information, and
the executability determination unit is further configured to extract the image information from each of the electronic documents as the operation object for the operation request and the electronic document as the operation object for the previous operation request to analyze the extracted image information, and to determine that the operation object in the operation information and the operation object in the previous operation information are similar to each other in the case where it is determined that the image information extracted from the electronic document as the operation object for the operation request and the image information extracted from the electronic document as the operation object for the previous operation request are similar to each other.

6. The document management apparatus according to claim 5,
wherein the image information includes a face image, and
the executability determination unit is further configured to determine that the operation object in the operation information and the operation object in the previous operation information are similar to each other in the case where it is determined that the face image included in the image information extracted from the electronic document as the operation object for the operation request and the face image included in the image information extracted from the electronic document as the operation object for the previous operation request are a face image of an identical person.

7. The document management apparatus according to claim 3,
wherein the electronic document contains audio information including a voice, and
the executability determination unit is further configured to extract the audio information from each of the electronic document as the operation object for the operation request and the electronic document as the operation object for the previous operation request to analyze the extracted audio information, and to determine that the operation object in the operation information and the operation object in the previous operation information are similar to each other in the case where it is determined that the voice included in the audio information extracted from the electronic document as the operation object for the operation request and the voice included in the audio information extracted from the electronic document as the operation object for the previous operation request are uttered by an identical person.

8. The document management apparatus according to claim 1,
wherein the operation information and the previous operation information include information indicating an operation time, and the executability determination unit is further configured to extract from the operation history information the earliest operation time in a day and the latest operation time in a day among operation times in the previous operation information, and to determine that the operation is executable in the case where the operation time in the operation information falls between the earliest operation time and the latest operation time.

9. The document management apparatus according to claim 1,
wherein the operation information and the previous operation information include information indicating an IP address of a terminal utilized by an operator, and
the executability determination unit is further configured to determine that the operation is executable in the case where the operation history information includes such previous operation information that the IP address in the operation information and the IP address in the previous operation information match each other.

10. The document management apparatus according to claim 1,
wherein the operation information and the previous operation information include information indicating a client utilized by an operator, and
the executability determination unit is further configured to determine that the operation is executable in the case where the operation history information includes such previous operation information that the client in the operation information and the client in the previous operation information match each other.

11. A non-transitory computer readable medium storing a program causing a computer to function as:
a reception unit configured to receive an operation request for an electronic document from an operator;
a memory configured to store operation history information which is an accumulation of previous operation information which is operation information related to previous operation requests previously made for electronic documents;
an executability determination unit configured to read the operation history information from the memory to determine whether a first operation, requested by the operation request to be performed to the electronic document, is executable using at least a determination that the first operation matches a second operation indicated in the operation history information as having been previously performed to the electronic document; and
an operation execution unit configured to, in the case where the executability determination unit determines that the first operation is executable by determining that the first operation matches the second operation, execute the first operation pertaining to the operation request, wherein
the operation execution unit is further configured to, in a case where the executability determination unit determines that the extension of the electronic document, as indicated in the operation request, matches the extension of the electronic document, as indicated in the operation history information, execute the operation pertaining to the operation request.

* * * * *